(12) United States Patent
Hu et al.

(10) Patent No.: US 12,176,760 B2
(45) Date of Patent: Dec. 24, 2024

(54) INTERIOR PERMANENT MAGNET MOTOR

(71) Applicant: Nidec Corporation, Kyoto (JP)

(72) Inventors: Yabo Hu, Kyoto (JP); Tomoya Ueda, Kyoto (JP); Kosuke Mizuike, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 279 days.

(21) Appl. No.: 17/634,257

(22) PCT Filed: Jun. 8, 2020

(86) PCT No.: PCT/JP2020/022578
§ 371 (c)(1),
(2) Date: Feb. 10, 2022

(87) PCT Pub. No.: WO2021/039016
PCT Pub. Date: Mar. 4, 2021

(65) Prior Publication Data
US 2022/0278573 A1     Sep. 1, 2022

(30) Foreign Application Priority Data
Aug. 26, 2019 (JP) ................................ 2019-153905

(51) Int. Cl.
*H02K 1/276* (2022.01)
(52) U.S. Cl.
CPC ......... *H02K 1/276* (2013.01); *H02K 2201/15* (2013.01); *H02K 2213/03* (2013.01)
(58) Field of Classification Search
CPC . H02K 1/276; H02K 2201/15; H02K 2213/03
See application file for complete search history.

(56) References Cited

U.S. PATENT DOCUMENTS

| 4,327,302 A | 4/1982 | Hershberger | |
|---|---|---|---|
| 5,786,650 A * | 7/1998 | Uchida | H02K 15/03 |
| | | | 310/156.55 |

(Continued)

FOREIGN PATENT DOCUMENTS

| DE | 10 2009 046 716 A1 | 5/2011 |
|---|---|---|
| JP | 2013-123365 A | 6/2013 |

(Continued)

OTHER PUBLICATIONS

English machine translation, Mitsuru JP 2015-47009. (Year: 2015).*

(Continued)

*Primary Examiner* — Burton S Mullins
(74) *Attorney, Agent, or Firm* — Keating & Bennett, LLP

(57) ABSTRACT

An interior permanent magnet motor includes a rotor with permanent magnets spaced apart in a circumferential direction, and a rotor core with core pieces positioned between adjacent permanent magnets. The permanent magnets include a pair of corner portions at each of an end on an outside in a radial direction and an end on an inside in the radial direction. Each of the core pieces includes at least one of an outer support portion that supports one corner portion of the pair of corner portions at the end of the permanent magnets on the outside in the radial direction or an inner support portion that supports one corner portion of the pair of corner portions at the end of the permanent magnets on the inside in the radial direction, and restricts movement of the permanent magnets in the radial direction.

7 Claims, 6 Drawing Sheets

(56) References Cited

U.S. PATENT DOCUMENTS

| | | | | |
|---|---|---|---|---|
| 9,024,498 | B2* | 5/2015 | Murakami | H02K 1/2773 |
| | | | | 310/156.43 |
| 9,048,712 | B2* | 6/2015 | Lee | H02K 1/2773 |
| 9,099,905 | B2* | 8/2015 | Manz | H02K 1/274 |
| 9,281,723 | B2* | 3/2016 | Watanabe | H02K 1/2766 |
| 9,742,230 | B2* | 8/2017 | Pan | H02K 1/2773 |
| 10,020,701 | B2* | 7/2018 | Kamiyoshihara | H02K 1/278 |
| 2003/0173853 | A1 | 9/2003 | Knauff et al. | |
| 2007/0228861 | A1* | 10/2007 | Kinoshita | H02K 1/276 |
| | | | | 310/156.01 |
| 2013/0119808 | A1* | 5/2013 | Hirokawa | H02K 1/2773 |
| | | | | 310/156.43 |
| 2013/0207507 | A1* | 8/2013 | Han | H02K 15/03 |
| | | | | 310/216.007 |
| 2015/0028710 | A1* | 1/2015 | Oka | H02K 1/27 |
| | | | | 29/598 |
| 2015/0145367 | A1 | 5/2015 | Li et al. | |
| 2015/0244218 | A1* | 8/2015 | Kaufmann | H02K 1/28 |
| | | | | 310/156.58 |
| 2017/0126081 | A1* | 5/2017 | Kim | H02K 1/2773 |
| 2019/0149000 | A1* | 5/2019 | Hosoda | H02K 1/2766 |
| | | | | 310/156.07 |

FOREIGN PATENT DOCUMENTS

| | | | | |
|---|---|---|---|---|
| JP | 2015-047009 | * | 3/2015 | ............ H02K 1/27 |
| JP | 2015-047009 | A | 3/2015 | |
| JP | 2015-082860 | A | 4/2015 | |
| JP | 2015-107051 | A | 6/2015 | |
| JP | 2017-201853 | A | 11/2017 | |
| JP | 2019-106788 | A | 6/2019 | |
| JP | 2019-106789 | A | 6/2019 | |

OTHER PUBLICATIONS

Official Communication issued in corresponding European Patent Application No. 20859591.8, mailed on Aug. 29, 2023.

Official Communication issued in International Patent Application No. PCT/JP2020/022578, mailed on Aug. 11, 2020.

Official Communication issued in corresponding Chinese Patent Application No. 202080060670.6, mailed on May 27, 2023.

* cited by examiner

INTERIOR PERMANENT MAGNET MOTOR

CROSS-REFERENCE TO RELATED APPLICATIONS

This is a U.S. national stage of application No. PCT/JP2020/022578, filed on Jun. 8, 2020, and priority under 35 U.S.C. § 119(a) and 35 U.S.C. § 365(b) is claimed from Japanese Patent Application No. 2019-153905, filed on Aug. 26, 2019, the entire disclosures of which are hereby incorporated herein by reference.

1. FIELD OF THE INVENTION

The present disclosure relates to an interior permanent magnet motor.

2. BACKGROUND

In the related art, a spoke type interior permanent magnet (IPM) motor in which magnets having a rectangular cross section perpendicular to a central axis of a motor are radially arranged in a rotor core is known. The IPM motor has an advantage that a high torque can be realized since a reluctance torque can be used and high-speed rotation is performed since a permanent magnet is embedded in a rotor.

However, in the conventional interior permanent magnet motor, at least three corner portions of the permanent magnet having the rectangular cross section disposed in the rotor core are held, and leakage magnetic flux is large.

SUMMARY

An example embodiment of the present disclosure is an interior permanent magnet motor including a rotor that includes permanent magnets spaced apart in a circumferential direction, and a rotor core including core pieces positioned between the permanent magnets adjacent to each other. The permanent magnets include a pair of core portions at each of an end on an outside in a radial direction and an end on an inside in the radial direction, and each of the core pieces includes at least one of an outer support portion that supports one corner portion of the pair of corner portions at the end of the permanent magnets on the outside in the radial direction or an inner support portion that supports one corner portion of the pair of corner portions at the end of the permanent magnets on the inside in the radial direction, and restricts movement of the magnets in the radial direction.

The above and other elements, features, steps, characteristics and advantages of the present disclosure will become more apparent from the following detailed description of the example embodiments with reference to the attached drawings.

DETAILED DESCRIPTION

Hereinafter, a schematic configuration of a spoke type IPM motor 1 as an example embodiment of an interior permanent magnet motor according to the present disclosure will be described with reference to FIGS. 1 to 4.

Figure 1:
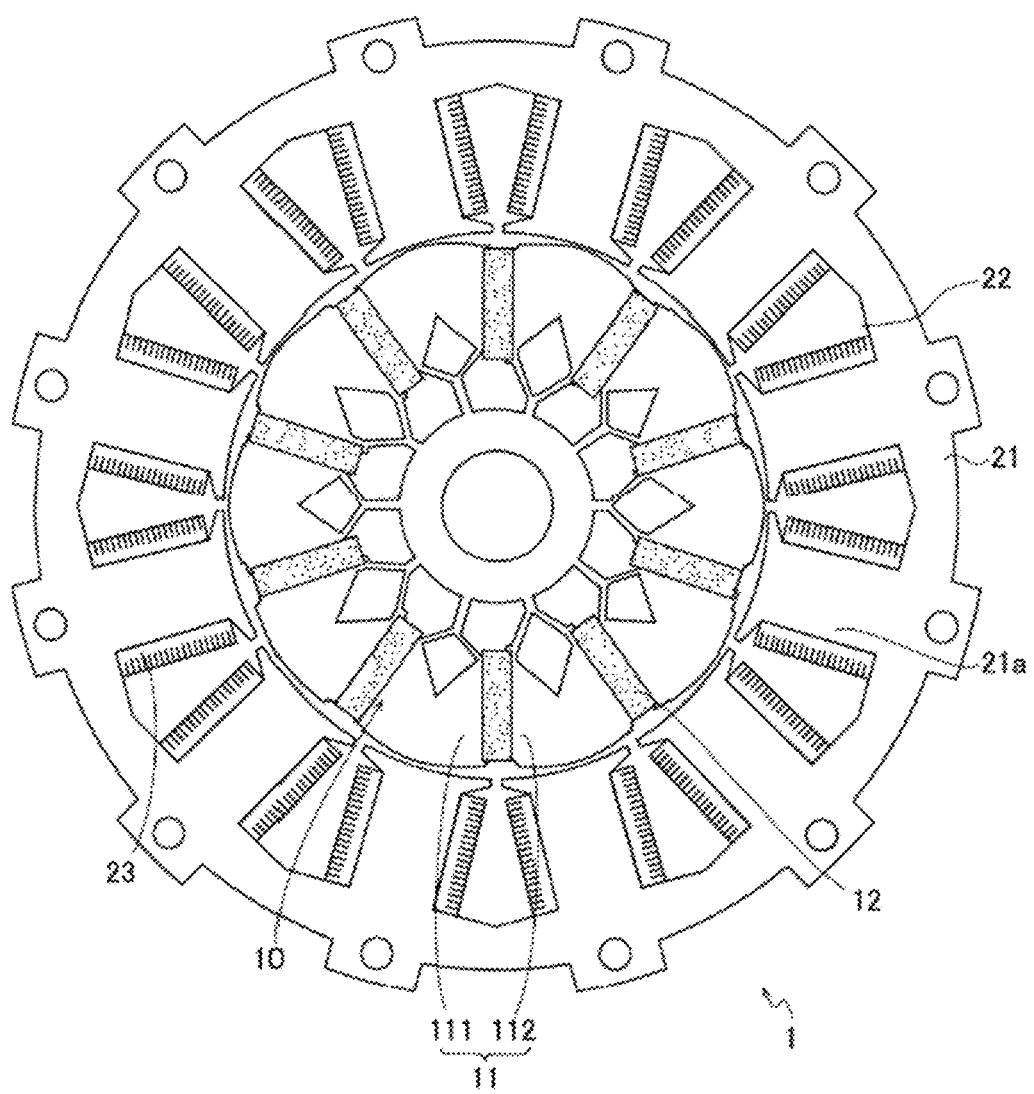
FIG. 1 is a diagram illustrating an example of an interior permanent magnet motor according to a first example embodiment of the present disclosure.

FIG. 1 illustrates an example of the spoke type IPM motor of the present example embodiment.

As illustrated in FIG. 1, the spoke type IPM motor 1 of the present example embodiment includes a rotor 10 and a stator 20 disposed on an outer periphery of the rotor 10 with a gap interposed therebetween.

The rotor 10 includes a rotor core 11 formed by stacking, for example, electromagnetic steel plates. The rotor core 11 also serves as a yoke. The rotor core 11 is made of a plurality of steel plates having the same shape and stacked in an axial direction of the rotor 10 so as to facilitate punching. A plurality of insertion holes spaced apart in a circumferential direction is provided in the rotor core 11.

A permanent magnet 12 is accommodated in each insertion hole. Thus, the plurality of permanent magnets 12 are arranged at intervals in the circumferential direction.

Each insertion hole is preferably provided in substantially the same shape as a shape of the permanent magnet 12 to be accommodated. Each insertion hole has a rectangular shape in a plane perpendicular to a rotation axis of the rotor 10 (that is, as viewed from the axial direction of the rotor 10), a pair of parallel long sides thereof are provided so as to be parallel to a radial direction of the rotor 10, and a pair of parallel short sides thereof are provided so as to be substantially parallel to the circumferential direction. The insertion hole has a depth of the rotor 10 in the axial direction. The insertion hole may be a through-hole.

A magnetization direction of the permanent magnet 12 is parallel to the circumferential direction of the rotor 10, and magnetization directions of the permanent magnets 12 adjacent to each other in the circumferential direction are opposite to each other.

The stator 20 includes, for example, a stator core 21 in which electromagnetic steel plates are stacked. The stator core 21 has a slot 22.

A winding (coil) 23 is wound around each tooth 21a of the stator core 21. The coil 23 is, for example, three-phase Y connection. Although the stator 20 having a 12-slot structure is illustrated in FIG. 1, the number of slots is not limited thereto, and can be selected according to the purpose of the motor.

FIG. 1 illustrates the rotor 10 having a 10-pole structure, but the number of poles is not limited thereto, and can be selected according to the purpose of the motor. The number of poles, that is, the number of insertion holes into which the permanent magnets are inserted is preferably an even number, and the poles are preferably arranged at equal intervals in the circumferential direction.

As illustrated in FIG. 1, an outer peripheral shape of the rotor core 11 is preferably formed in a shape that is not a perfect circle in a plane perpendicular to the rotation axis. Preferably, the outer peripheral shape of the rotor core 11 in the plane perpendicular to the rotation axis is the same number of arc shapes protruding outward as the permanent magnets 12. Such an outer peripheral shape is effective when it is desired to reduce a torque ripple and a cogging torque.

As the permanent magnet 12, for example, a rare earth sintered magnet having excellent residual magnetic flux density and coercive force can be applied. Examples of the rare earth sintered magnet include an Nd-based rare earth sintered magnet and an Sm-based rare earth sintered magnet, and the Nd-based rare earth sintered magnet is more preferable. Examples of the Nd-based rare earth sintered magnet include a sintered magnet having an Nd-Fe-B-based composition.

The permanent magnet 12 is preferably a rectangular parallelepiped. The permanent magnet 12 is accommodated in the insertion hole in a rectangular shape having a long side parallel to the radial direction of the rotor 10 and a short side substantially parallel to the circumferential direction in the plane perpendicular to the rotation axis of the rotor 10 and having four sides in the axial direction of the rotor 10.

A height of the permanent magnet 12 may be substantially the same as a height (axial length) of the rotor 10.

As the permanent magnet 12, one permanent magnet piece may be accommodated in each insertion hole of the rotor core 11. Alternatively, the plurality of permanent magnet pieces divided into the insertion holes of the rotor core 11 may be accommodated in a state of being stacked and bonded using an adhesive or the like. The plurality of divided permanent magnet pieces may be stacked and accommodated without using an adhesive or the like.

Figure 2:
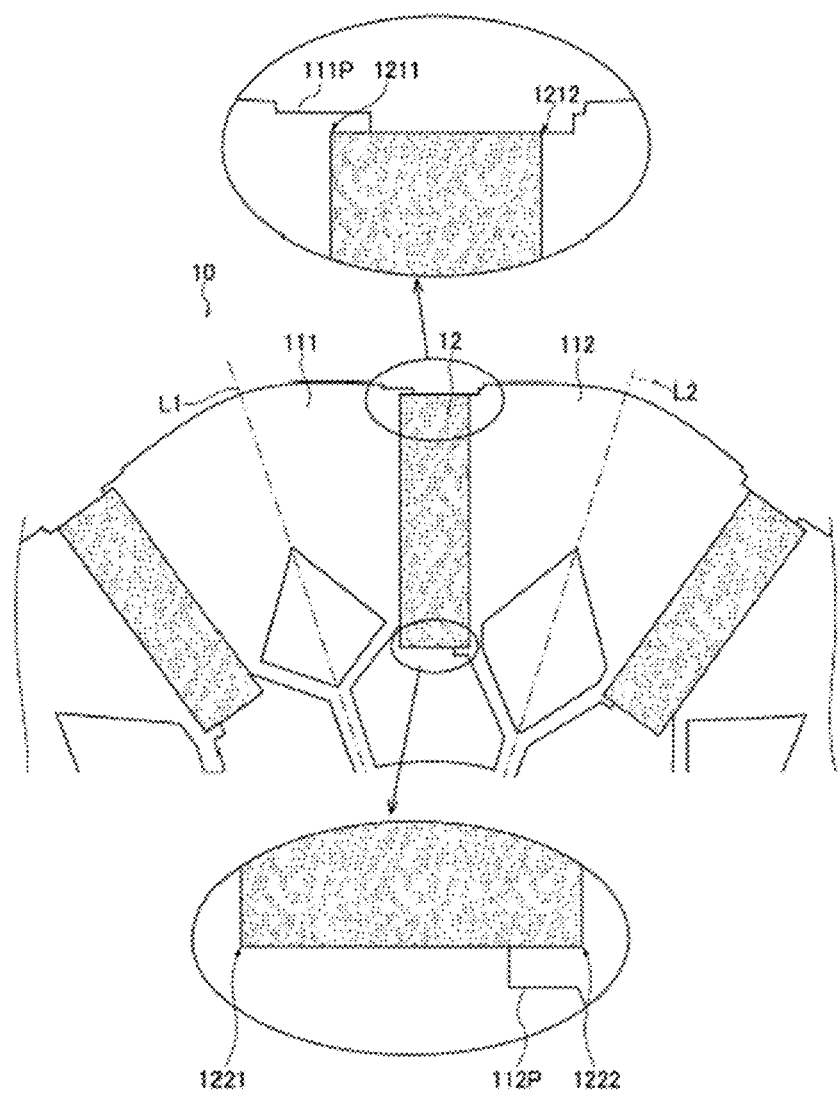
FIG. 2 is an enlarged view illustrating a portion of a rotor of the interior permanent magnet motor illustrated in FIG. 1.

A form of the rotor 10 around the permanent magnet 12 will be further described with reference to FIG. 2. FIG. 2 illustrates a part of the rotor of the interior permanent magnet motor illustrated in FIG. 1 in an enlarged manner.

As illustrated in FIG. 2, the rotor core 11 includes a plurality of core pieces in which first core pieces 111 and second core pieces 112 are alternately arranged in the circumferential direction. The plurality of core pieces are positioned between the plurality of permanent magnets 12 adjacent to each other, respectively. Since the illustrative spoke type IPM motor 1 of the present example embodiment includes the rotor 10 having the 10-pole structure, five pairs of the first core piece 111 and the second core piece 112 are provided in the circumferential direction. Both the first core piece 111 and the second core piece 112 have a substantially arc shape on an outside in the radial direction as viewed from the axial direction of the rotor 10.

The permanent magnet 12 having the rectangular shape as viewed from the axial direction has a pair of corner portions 1211 and 1212 at an end on the outside in the radial direction and a pair of corner portions 1221 and 1222 at an end on an inside in the radial direction.

Each of the first core piece 111 and the second core piece 112 has at least one of an outer support portion that supports one corner of the pair of corner portions 1211 and 1212 of the permanent magnet 12 at the end on the outside in the radial direction or an inner support portion that supports one corner of the pair of corner portions 1221 and 1222 of the permanent magnet at the end on the inside in the radial direction, and is configured to restrict the movement of the plurality of permanent magnets 12 in the radial direction.

More specifically, the first core piece 111 has a pair of outer support portions 111P at a start point and an end point (that is, both sides) of the arc shape on the outside in the radial direction. The pair of outer support portions 111P are provided to restrict the movement of two permanent magnets 12 adjacent in the circumferential direction toward the outside in the radial direction, among the plurality of permanent magnets 12. The outer support portion 111P is a protrusion protruding in the circumferential direction.

The second core piece 112 has a pair of inner support portions 112P on the inside in the radial direction. The pair of inner support portions 112P are provided to restrict the movement of two permanent magnets 12 adjacent in the circumferential direction toward the inside in the radial direction, among the plurality of permanent magnets 12. The inner support portion 112P is a protrusion protruding in the circumferential direction.

The second core piece 112 does not include the outer support portion that restricts the movement of the permanent magnets 12 toward the outside in the radial direction on the outside in the radial direction. Thus, each of the plurality of permanent magnets 12 is configured such that only one of the corner portion 1211 or the corner portion 1212 is supported on the outside in the radial direction. Thus, as compared with the case where the outer support portions are provided on both the corner portions 1211 and 1212 of the permanent magnet 12 on the outside in the radial direction, the distance from the end of the outer support portion 111P to the second core piece 112 in the circumferential direction is long, and the leakage magnetic flux can be reduced.

Since the first core piece 111 having the outer support portions 111P on both sides in the circumferential direction and the second core piece 112 having the inner support portions 112P on both sides in the circumferential direction are alternately and continuously arranged in the circumferential direction, it is possible to achieve the holding of the permanent magnet 12, the reduction of the leakage magnetic flux, and the reduction of a motor characteristic difference with respect to both clockwise rotation and semi-clockwise rotation in a well-balanced manner.

As illustrated in FIG. 2, each of the plurality of permanent magnets 12 is configured to be supported by any one of the following aspects (i) and (ii).

(i) The corner portion 1211 of the permanent magnet 12 is supported by the outer support portion 111P of the first core piece 111, and the corner portion 1222 of the permanent magnet 12 is supported by the inner support portion 112P of the second core piece 112.

(ii) The corner portion 1212 of the permanent magnet 12 is supported by the outer support portion 111P of the first core piece 111, and the corner portion 1221 of the permanent magnet 12 is supported by the inner support portion 112P of the second core piece 112.

That is, each permanent magnet 12 is supported at the corner portion positioned at the diagonal. Thus, in the spoke type IPM motor 1 of the present example embodiment, the permanent magnet 12 can be held more stably.

In FIG. 2, virtual center lines L1 and L2 in the radial direction extending from the rotation axis of the rotor 10 are described with respect to the first core piece 111 and the second core piece 112. Here, the first core piece 111 is line-symmetric with respect to the virtual center line L1, and the second core piece 112 is line-symmetric with respect to the virtual center line L2. Thus, the motor characteristic difference can be reduced with respect to both the clockwise rotation and the semi-clockwise rotation of the rotor 10.

Next, a preferable shape of the first core piece 111 will be described focusing on the portion of the permanent magnet 12 on the inside in the radial direction with reference to FIGS. 3 and 4.

Figure 3:
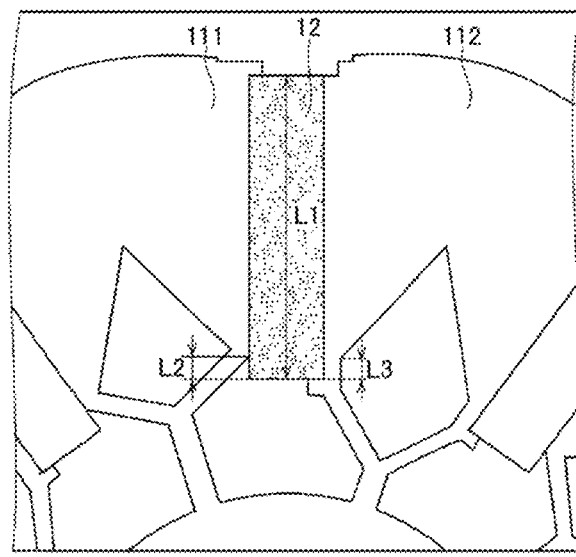
FIG. 3 is a diagram illustrating a dimensional relationship between a permanent magnet and a rotor core in the interior permanent magnet motor illustrated in FIG. 1.

As illustrated in FIG. 3, each dimension is defined as follows. That is, a length (length in the radial direction) of the long side of the permanent magnet 12 is L1, a length of the portion where the permanent magnet 12 is exposed from the first core piece 111 in the radial direction of the permanent magnet is L2, and a length of the portion in the radial direction where the permanent magnet 12 is in contact with a thinnest portion of the second core piece 112 in the circumferential direction is L3.

Figure 4:
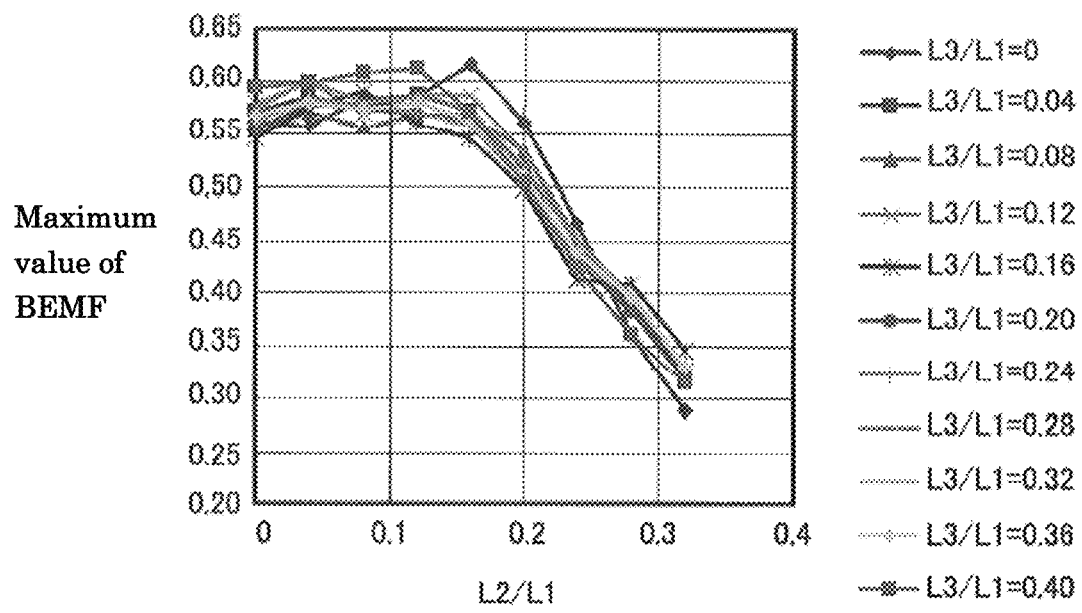
FIG. 4 is a diagram illustrating a relationship between L2/L1 in FIG. 3 and a maximum value of a back electromotive force.

At this time, a result of obtaining a relationship between a value of L2/L1 and a maximum value of a back electromotive force (BEMF) generated in the spoke type IPM motor 1 with respect to values of L3/L1 of various values by simulation is illustrated in FIG. 4. As illustrated in FIG. 4, it can be seen that the maximum value of the BEMF does not decrease by setting the value of L2/L1 to 0.15 or less for any of the values of L3/L1. Accordingly, there is an advantage that the back electromotive force is not affected by designing the shape of the first core piece 111 such that the value of L2/L1 is 0.15 or less.

Next, a spoke type IPM motor according to a second example embodiment will be described. A basic structure of the spoke type IPM motor of the present example embodiment is the same as the structure of the spoke type IPM motor 1 of the first example embodiment.

In the spoke type IPM motor 1 of the first example embodiment, both the first core piece 111 and the second core piece 112 have substantially the arc shape on the outside in the radial direction as viewed from the axial direction of the rotor 10. Here, it is known that a width and a curvature of an arc-shaped portion greatly affect the torque ripple of the spoke type IPM motor.

For example, when the width of the arc-shaped portion of the core piece is increased, a distance between the core pieces adjacent in the circumferential direction decreases, the leakage magnetic flux increases, and the generated torque decreases. When the curvature of the arc-shaped portion is decreased, a distance between the permanent magnet 12 and the stator 20 increases, the leakage magnetic flux increases, and the generated torque decreases.

Thus, as in the first example embodiment, in the spoke type IPM motor of the present example embodiment, in order to reduce the torque ripple while the first core piece includes the outer support portion, an outer peripheral surface of each of the first core piece and the second core piece has an arc shape as a whole as viewed from the axial direction of the rotor 10, and the outer peripheral surface has an arc-shaped portion positioned at a center in the circumferential direction and linear portions positioned on both sides of the arc-shaped portion.

Figure 5:
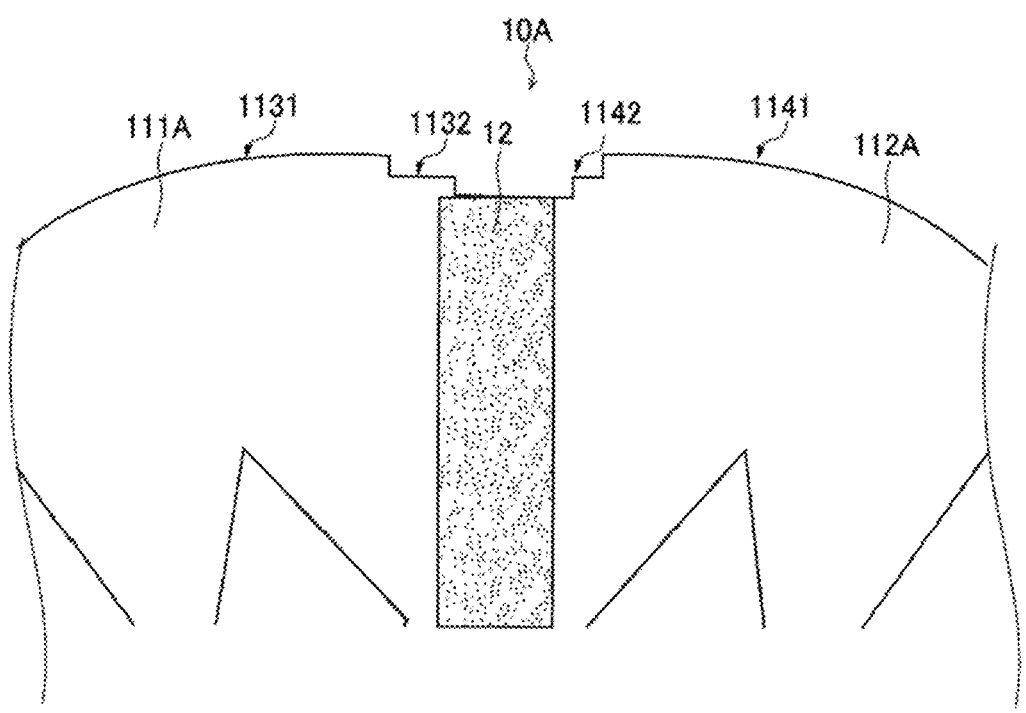
FIG. 5 is a diagram illustrating a first example of a shape of a rotor core of an interior permanent magnet motor according to a second example embodiment of the present disclosure.
Figure 6:
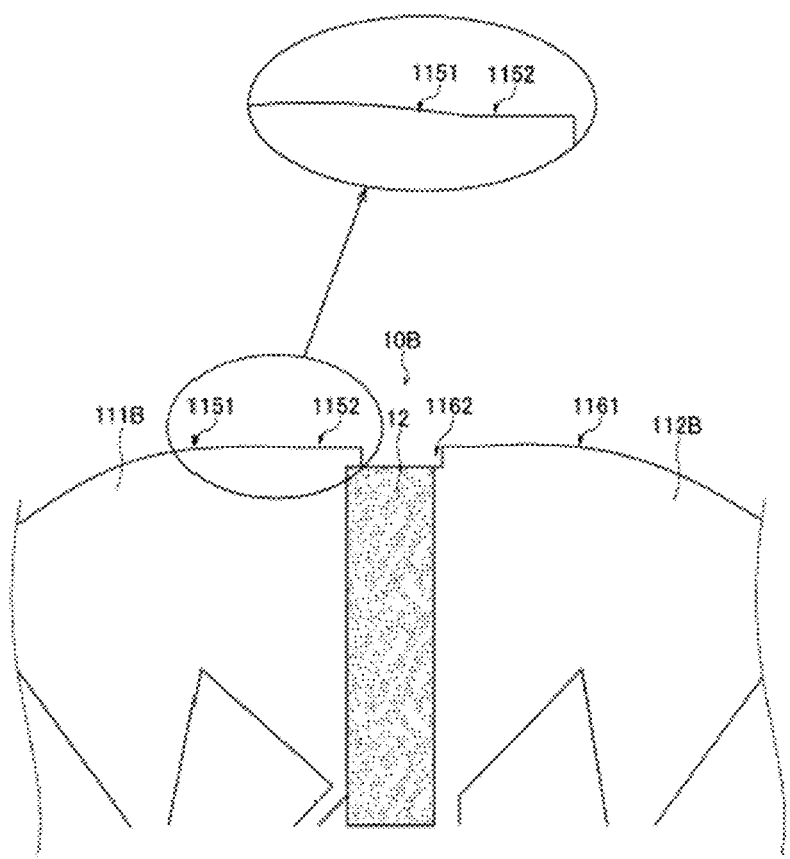
FIG. 6 is a diagram illustrating a second example of the shape of the rotor core of the interior permanent magnet motor according to the second example embodiment of the present disclosure.

Specific configuration examples are illustrated in FIGS. 5 and 6.

FIG. 5 is a diagram illustrating a shape of a rotor core according to a first example of the present example embodiment. A shape of a rotor core of a rotor 10A of the first example is similar to the shape of the rotor 10 of the first example embodiment.

In this example, an outer shape of a first core piece 111A includes a linear portion 1132 for holding the permanent magnet 12 in the vicinity of the permanent magnet 12 while making a width of an arc-shaped portion 1131 as wide as possible so as not to increase the leakage magnetic flux by reducing a distance to the stator 20 (not illustrated in FIG. 5). The linear portion 1132 is formed to have a step with respect to the arc-shaped portion 1131, and functions as an outer support portion that restricts the movement of the permanent magnet 12 toward the outside in the radial direction.

On the other hand, as in the first example embodiment, in an outer shape of a second core piece 112A, a linear portion 1142 is provided in the vicinity of the permanent magnet 12 so as not to support the corner portion of the permanent magnet 12 while making a width of an arc-shaped portion 1141 as wide as possible so as not to increase the leakage magnetic flux.

FIG. 6 is a diagram illustrating a shape of a rotor core according to a second example of the present example embodiment. As can be seen from comparison with FIG. 5, in a rotor core of a rotor 10B of the second example, steps are not formed at both ends of a first core piece 111B.

In this example, an outer shape of the first core piece 111B has a linear portion 1152 for holding the permanent magnet 12 in the vicinity of the permanent magnet 12 while making a width of an arc-shaped portion 1151 as wide as possible so as not to increase the leakage magnetic flux by reducing the distance to the stator 20 (not illustrated in FIG. 6). The linear portion 1152 is formed so as to be smoothly continuous with the arc-shaped portion 1151, and functions as an outer support portion that restricts the movement of the permanent magnet 12 toward the outside in the radial direction.

On the other hand, as in the first example embodiment, in an outer shape of a second core piece 112B, a linear portion 1162 is provided in the vicinity of the permanent magnet 12 so as not to support the corner portion of the permanent magnet 12 while making a width of an arc-shaped portion 1161 as wide as possible so as not to increase the leakage magnetic flux.

Hereinafter, a preferable setting method of a height of a step between the arc-shaped portion 1131 and the linear portion 1132 in the shape of the rotor core of the first example of FIG. 5 will be described with reference to FIG. 7.

Figure 7:
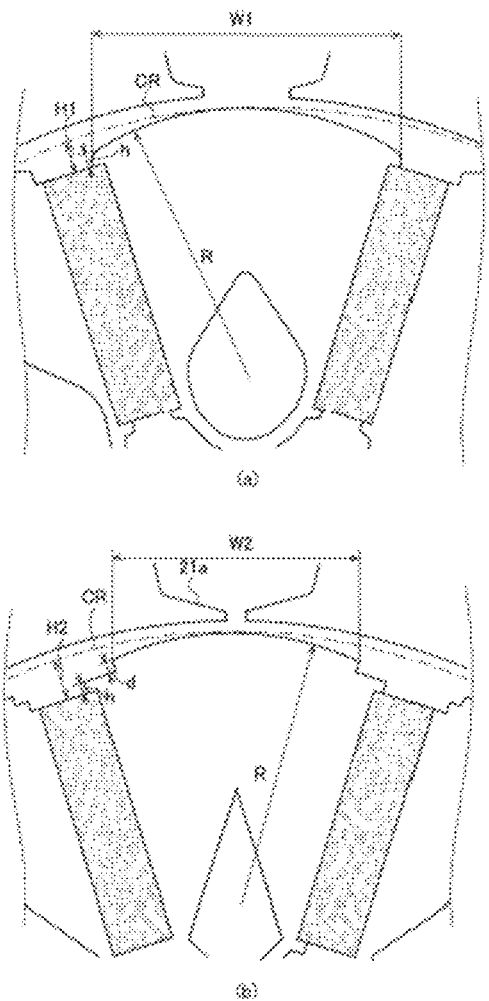
FIG. 7 is a diagram for defining dimensions of the rotor core of the interior permanent magnet motor according to the second example embodiment of the present disclosure.

In FIG. 7, (a) illustrates a shape of a rotor core of the related art having no step as a reference shape, and (b) illustrates the shape of the rotor core of the first example of FIG. 5 having the step.

In FIG. 7, definition is given as follows.

H1, H2: Distance between end of permanent magnet on outside in radial direction and rotor outer diameter CR
W1, W2: Width of arc-shaped portion
h: Protrusion height
d: Height of step
R: Curvature of arc-shaped portion In this case, distances $H_1$ and $H_2$ are expressed by the following Expressions (1) and (2).

[Math. 1]

$$H1 = h + R - \sqrt{\left(R^2 - \frac{W1^2}{4}\right)} \quad (1)$$

[Math. 2]

$$H2 = h + R - \sqrt{\left(R^2 - \frac{W2^2}{4}\right)} + d \quad (2)$$

In the case of the first example of the present example embodiment, it is necessary to satisfy $H_2 \leq H_1$ in order to prevent the distance between the magnet and the stator from becoming longer than the distance of the related art (that is, the effective magnetic flux is not reduced as compared with the case of the related art). The height d of the step for this purpose is set as in the following Expression (3).

[Math. 3]

$$0 \le d \le \sqrt{\left(R^2 - \frac{W1^2}{4}\right)} - \sqrt{\left(R^2 - \frac{W2^2}{4}\right)} \quad (3)$$

As described above, the example embodiments of the interior permanent magnet motor according to the present disclosure have been described in detail. However, a scope of the present disclosure is not limited to the above example embodiments. The above-described example embodiments can be variously improved or changed without departing from the gist of the present disclosure.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An interior permanent magnet motor comprising:
   a rotor including permanent magnets spaced apart in a circumferential direction; and
   a rotor core including core pieces between respective adjacent pairs of the permanent magnets; wherein
   each of the permanent magnets includes a pair of corner portions at each of an end on an outside in a radial direction and an end on an inside in the radial direction;
   each of the core pieces includes at least one of:
      an outer support portion that supports one corner portion of the pair of corner portions at the end of one of the permanent magnets on the outside in the radial direction; or
      an inner support portion that supports one corner portion of the pair of corner portions at the end of the permanent magnets on the inside in the radial direction, and restricts movement of the permanent magnets in the radial direction;
   at least one of the core pieces includes a linear portion which is located adjacent to one of the pair of corner portions of one of the permanent magnets, the linear portion extending away from the one of the pair of corner portions of one of the permanent magnets in a circumferential direction such that the linear portion does not support the one of the pair of corner portions of one of the permanent magnets; and
   when a length of one of the permanent magnets in the radial direction is L1 and a length of a portion where the one of the permanent magnets is exposed from the core piece in the radial direction of the one of the permanent magnets is L2, L2 is equal to or less than about 0.15 of L1.

2. The interior permanent magnet motor according to claim 1, wherein
   the permanent magnets have a rectangular shape as viewed from an axial direction of the rotor; and
   the outer support portion and the inner support portion are positioned at diagonals of the permanent magnets.

3. The interior permanent magnet motor according to claim 1, wherein
   at least one of the outer support portion and the inner support portion is positioned on one side of the core pieces diagonally from a position of the linear portion; and
   each of the core pieces is line-symmetric with respect to a virtual center line in the radial direction extending from a rotation axis of the rotor as viewed from an axial direction of the rotor.

4. The interior permanent magnet motor according to claim 3, wherein
   each of the core pieces respectively supports two of the permanent magnets; and
   the core pieces alternately include, in the circumferential direction, a first core piece including a pair of the outer support portions that restrict, toward the outside in the radial direction, movement of two of the permanent magnets adjacent in the circumferential direction and a second core piece including a pair of the inner support portions that restrict, toward the inside in the radial direction, movement of two of the permanent magnets adjacent in the circumferential direction.

5. The interior permanent magnet motor according to claim 1, wherein the rotor core includes steel plates stacked in an axial direction of the rotor.

6. The interior permanent magnet motor according to claim 1, wherein the linear portion includes a step-shaped portion.

7. The interior permanent magnet motor according to claim 1, wherein circumferential side portions of the permanent magnets opposite to the inner support portion are uncovered by and exposed from ones of the core pieces which include a pair of the outer support portions.

* * * * *